(12) United States Patent
Huang et al.

(10) Patent No.: US 12,348,624 B2
(45) Date of Patent: Jul. 1, 2025

(54) WAPI TRUSTED WIRELESS LOCAL AREA NETWORK DEVICE

(71) Applicant: China Southern Power Grid Energy Storage Co., Ltd Information and Communication Branch, Guangzhou (CN)

(72) Inventors: Jiadong Huang, Guangzhou (CN); Zimao Liu, Guangzhou (CN); Xiaoyi Wang, Guangzhou (CN); Yaodong Ju, Guangzhou (CN); Cheng Ma, Guangzhou (CN); Yi Dong, Guangzhou (CN)

(73) Assignee: China Southern Power Grid Energy Storage Co., Ltd Information and Communication Branch, Guangzhou (CN)

( * ) Notice: Subject to any disclaimer, the term of this patent is extended or adjusted under 35 U.S.C. 154(b) by 0 days.

(21) Appl. No.: 19/031,211

(22) Filed: Jan. 17, 2025

(65) Prior Publication Data
US 2025/0184127 A1 Jun. 5, 2025

Related U.S. Application Data

(63) Continuation of application No. PCT/CN2024/124899, filed on Oct. 15, 2024.

(30) Foreign Application Priority Data

Dec. 4, 2023 (CN) .......................... 202311647511.8

(51) Int. Cl.
*H04L 29/06* (2006.01)
*H04L 9/08* (2006.01)
(Continued)

(52) U.S. Cl.
CPC .............. *H04L 9/0861* (2013.01); *H04L 9/32* (2013.01); *H04W 12/033* (2021.01); *H04W 12/106* (2021.01)

(58) Field of Classification Search
None
See application file for complete search history.

(56) References Cited

U.S. PATENT DOCUMENTS 10,079,810 B1 * 9/2018 Moore ................ H04L 63/1416
11,366,897 B1 * 6/2022 Ramanathan ......... H04L 9/0861
(Continued)

FOREIGN PATENT DOCUMENTS

| CN | 104955049 A | 9/2015 |
| CN | 113726512 A | 11/2021 |
| CN | 116108416 A | 5/2023 |

OTHER PUBLICATIONS

Fahmy, Syahrul et al. Wireless network attack: Raising the awareness of Kampung WiFi residents. 2012 International Conference on Computer & Information Science (ICCIS). https://ieeexplore.ieee.org/stamp/stamp.jsp?tp=&arnumber=6297124 (Year: 2012).*
(Continued)

*Primary Examiner* — Jeremiah L Avery
(74) *Attorney, Agent, or Firm* — Nitin Kaushik

(57) ABSTRACT

The present invention provides a WAPI trusted wireless local area network device, and relates to the field of WAPI local area network devices. The WAPI trusted wireless local area network device includes a data obtaining module, an information obtaining module, a key module, an encryption module, a data transmission module, a data receiving module, a decoding module, a storage module, a data check module, an alarm module, and a data output module. Different keys are generated based on a sending time of initial data, primary encryption is performed on the initial data by using a key, and then secondary encryption is performed
(Continued)

based on a preset encryption protocol. The key has a self-updating ability according to the time, which can make an encryption manner of each group of initial data different, and improve the security of data transmission.

5 Claims, 2 Drawing Sheets

(51) Int. Cl.
*H04L 9/32* (2006.01)
*H04W 12/033* (2021.01)
*H04W 12/106* (2021.01)

(56) References Cited

U.S. PATENT DOCUMENTS

| | | | | |
|---|---|---|---|---|
| 11,601,266 | B1* | 3/2023 | Stapleton | G06F 21/72 |
| 11,895,232 | B1* | 2/2024 | Stapleton | H04L 9/0861 |
| 11,947,656 | B2* | 4/2024 | Finchelstein | G06F 18/22 |
| 12,126,713 | B1* | 10/2024 | Ramanathan | H04L 9/0861 |
| 2009/0251282 | A1* | 10/2009 | Fitzgerald | H04W 12/126 |
| | | | | 340/5.31 |
| 2015/0106616 | A1* | 4/2015 | Nix | H04L 63/061 |
| | | | | 713/170 |
| 2017/0109735 | A1* | 4/2017 | Sheng | G06Q 20/3678 |
| 2018/0241488 | A1* | 8/2018 | Daoura | H04W 4/70 |
| 2019/0349426 | A1* | 11/2019 | Smith | H04L 41/0806 |
| 2021/0320794 | A1* | 10/2021 | Auh | H04L 9/088 |
| 2021/0374497 | A1* | 12/2021 | Syed | G06K 19/073 |
| 2022/0255650 | A1* | 8/2022 | Daoura | H04W 4/029 |
| 2022/0263700 | A1* | 8/2022 | Dabbs | H04W 76/15 |
| 2023/0140203 | A1* | 5/2023 | Peng | H04L 9/14 |
| | | | | 700/275 |
| 2023/0171101 | A1* | 6/2023 | Auh | H04L 9/088 |
| | | | | 380/28 |

OTHER PUBLICATIONS

Liu, Runhao et al. iWEP: An Intelligent WLAN Early Warning Platform Using Edge Computing. 2019 15th International Conference on Mobile Ad-Hoc and Sensor Networks (MSN). https://ieeexplore.ieee.org/stamp/stamp.jsp?tp=&arnumber=9066146 (Year: 2019).*

Djellab, Rima; Benmohammed, Mohammed. Securing Encryption Key Distribution in WLAN via QKD. 2012 International Conference on Cyber-Enabled Distributed Computing and Knowledge Discovery. https://ieeexplore.ieee.org/stamp/stamp.jsp?tp=&arnumber=6384961 (Year: 2012).*

Ojha, Nitish Kumar; Baray, Elyas. An Overview of Protocols-Based Security Threats and Countermeasures in WLAN. 2023 4th International Conference for Emerging Technology (INCET). https://ieeexplore.ieee.org/stamp/stamp.jsp?tp=&arnumber=10170514 (Year: 2023).*

* cited by examiner

WAPI TRUSTED WIRELESS LOCAL AREA NETWORK DEVICE

CROSS-REFERENCE TO RELATED APPLICATIONS

The application claims priority to Chinese patent application No. 2023116475118, filed on Dec. 4, 2023, the entire contents of which are incorporated herein by reference.

TECHNICAL FIELD

The present invention relates to the field of WAPI local area network devices, and in particular, to a WAPI trusted wireless local area network device.

BACKGROUND

WAPI is an encryption standard under Wi-Fi technologies. A WAPI terminal completes identity authentication when accessing a network, which is widely used, and it is necessary to ensure the security of data transmission when the WAPI terminal accesses the network.

When an existing WAPI terminal accesses the network, mutual authentication is completed after the WAPI terminal, an access point, and a server are started. The server encrypts data requested by the WAPI terminal by using an encryption protocol specified by a WAPI protocol, and then sends the encrypted data to another WAPI terminal via the access point, which can improve the security of data transmission. However, this data encryption method is based on a given confidentiality agreement to encrypt data. When the confidentiality agreement is disclosed, overall data can be easily obtained, and it is not flexible in data protection.

In "DATA SECURITY MANAGEMENT METHOD, SYSTEM, AND DEVICE FOR WAPI TERMINAL ACCESS NETWORK" as disclosed in Chinese Patent Application No. CN202310799395.5, the method includes splitting access information into access data and an access name, and performing encryption on the access information based on a preset encryption rule and a random shielding index to form encrypted access data for transmission. However, this method does not describe a generation mode of the random shielding index. If the index is generated randomly by using a system or software, it is difficult to ensure that both random shielding indexes generated by two WAPI terminals are the same, which will cause another WAPI terminal device to be unable to decode; and if the index is preset by a user in advance, the random shielding index will become a fixed constant, which does not have a self-updating ability, needs to be replaced by the user regularly, and is more troublesome in use.

SUMMARY

An objective of the present invention is to provide a WAPI trusted wireless local area network device, to solve the problems raised in the above background.

To achieve the above objectives, the present invention provides a technical solution as follows:

A WAPI trusted wireless local area network device includes a sending device and a receiving device, where the sending device includes:

a data obtaining module, where the data obtaining module is electrically connected to an encryption module, and is configured to obtain initial data sent by a WAPI terminal and transmit the initial data to the encryption module for encryption;

an information obtaining module, where the information obtaining module is electrically connected to a key module, and is configured to obtain a sending time and a data number when the WAPI terminal sends the initial data and transmit the sending time and the data number to the key module for generating a key;

the key module, where the key module is electrically connected to the encryption module, and is configured to generate the key based on the sending time and the data number of the initial data and encrypt the initial data;

the encryption module, where the encryption module is electrically connected to a data transmission module, an encryption protocol is preset in the encryption module, and the encryption module is configured to perform primary encryption on the initial data based on the key generated by the key module and perform secondary encryption based on the preset encryption protocol; and the data transmission module, where the data transmission module is in communication connection with a data receiving module, and is configured to transmit data after secondary encryption; and the receiving device includes:

the data receiving module, where the data receiving module is electrically connected to a decoding module, and is configured to send the data after secondary encryption to the decoding module for decoding;

the decoding module, where the decoding module is electrically connected to a data check module and a storage module, a same encryption protocol as that in the encryption module is preset in the decoding module, and the decoding module is configured to decode the data after secondary encryption and send decoded data to the data check module and the storage module respectively;

the storage module, where the storage module is configured to save the decoded data;

the data check module, where the data check module is electrically connected to a data output module and an alarm module, and is configured to check whether data is missing or tampered in a transmission process and issue an alarm signal to the alarm module;

the alarm module, where the alarm module is configured to issue an alarm based on the alarm signal issued by the data check module; and the data output module, where the data output module is configured to output data.

Preferably, a logic for generating the key is as follows:

obtaining the sending time of the initial data sent by the WAPI terminal according to a format of year, month, day, hour, minute, and second, marked as Th, dividing the sending time Th into six character segments, marked as $a_i$, i=1,2,3 ... 6, and Th=$a_1, a_2, a_3 ... a_6$, where each character segment $a_i$ is a two-digit number, which is used for representing the year, month, day, hour, minute and second sequentially, and numbering the initial data sent by the WAPI terminal, marked as H; and generating a superposition start bit Pd based on the sending time Th, generating a check bit Py and a check length Pc based on the data number H, sequentially performing data splicing on the superposition start bit Pd, the check bit Py, the check length Pc, the sending time Th, and the data number H, and obtaining a final key, where the key is marked as $M_H$, that is:

$$\text{"}Pd\text{"} + \text{"}Py\text{"} + \text{"}Pc\text{"} + \text{"}Th\text{"} + \text{"}H\text{"} \xrightarrow{data\ splicing} M_H$$

where a subscript H represents a data number corresponding to the key.

Preferably, a logic for obtaining the superposition start bit Pd is as follows: calculating an average value of a sum of $a_1 \sim a_6$ in the sending time Th, marked as Pd', that is:

$$Pd' = \frac{\sum_{i=1}^{6} a_i}{6}$$

and obtaining the superposition start bit Pd after rounding the average value Pd' according to a rounding-off method.

Preferably, a logic for obtaining the check bit Py is as follows: generating a calculated value Py based on the data number H, with a calculation formula being:

$$Py = \log H + 1$$

obtaining the check bit Py after rounding the calculated valuePy' according to a rounding-off method, and calculating a theoretical length Pc' based on the check bit Py, with a calculation formula being:

$$Pc' = e^{Py}$$

and after rounding the theoretical length Pc according to the rounding-off method, taking its single digit as the check length Pc.

Preferably, a logic for the primary encryption is as follows:

obtaining a length of the initial data, marked as N, sequentially converting each character in the initial data according to an ASCII code table, marking a conversion character string as Sz, and marking each character segment as $b_j$, j=1,2,3 ... N, and Sz=$b_1$, $b_2$, $b_3$ ... $b_N$;

obtaining a value of a corresponding character segment $b_{Py}$, $b_{Py+1}$ ... $b_{Py+Pc-1}$ based on values of the check bit Py and the check length Pc, and marking the value as a check character segment b';

superposing the conversion character string Sz with the sending time Th from the corresponding character segment based on a value of the superposition start bit Pd, obtaining a superposition character string Sz, and marking each character segment in the superposition character string Sz as $c_p$, p=1,2,3 ... Pd ... Pd+q ... N', where q represents a length of the conversion character string Sz that is superposed with the sending time Th, and N' represents a length of the superposition character string Sz; and splicing the check character segment b', the key $M_H$, and the superposition character string Sz to obtain a primary encryption character string $Sz_1$.

Preferably, a logic for data decoding is as follows:

decoding, by the decoding module, the data after secondary encryption based on the preset encryption protocol, to obtain the primary encryption character string $Sz_1$;

performing data splitting on the primary encryption character string $Sz_1$, to obtain the check character segment b', the key $M_H$, and the superposition character string Sz';

performing data splitting on the key $M_H$, to obtain the superposition start bit Pd, the check bit Py, the check length Pc, the sending time Th, and the data number H; and removing the sending time Th in the superposition character string Sz' from the corresponding character segment based on the value of the superposition start bit Pd, to obtain the conversion character string Sz.

Preferably, a logic for checking data is as follows:

sending, by the decoding module, the check character segment b', the check bit Py, the check length Pc, and the conversion character string Sz that are obtained from splitting to the data check module;

obtaining a value of the corresponding character segment $b_{Py}$, $b_{Py+1}$ ... $b_{Py+Pc-1}$ in the conversion character string Sz based on the values of the check bit Py and the check length Pc, and comparing the value with the check character segment b'; and if the value is equal to the check character segment b', restoring the conversion character string Sz according to ASCII codes and transmitting the conversion character string to the data output module, and if the value is not equal to the check character segment b', issuing the alarm signal to the alarm module.

Compared with the prior art, the present invention has the following beneficial effects: Different keys are generated based on a sending time of initial data, primary encryption is performed on the initial data by using a key, and then secondary encryption is performed based on a preset encryption protocol. The key has a self-updating ability according to the time, which can make an encryption manner of each group of initial data different, and improve the security of data transmission. Besides, a check bit is set based on a serial number of the data, which can detect data after data transmission, prevent the data from being missing or tampered in a transmission process, and further improve the security of data transmission.

DETAILED DESCRIPTION OF THE EMBODIMENTS

In order to make the objectives, technical solutions, and advantages of the present invention clearer and more comprehensible, the present invention is described in further detail below with reference to the specific embodiments.

It should be noted that unless otherwise defined, the technical or scientific terms used in the present invention shall have the common meanings as understood by those skilled in the art to which the present invention belongs. The terms "first", "second", and the like used in the present invention are not intended to indicate any sequence, amount or importance, but distinguish different components. As used herein, "include", "comprise", and the like mean that an element or item appearing before the word covers an element, an item, or an equivalent thereof listed after the word without excluding other elements or items. As used herein, "connection", "connected", and the like are not limited to a physical or mechanical connection but may include a direct or indirect electrical connection. As used herein, "up", "down", "left", "right", and the like are merely used to represent a relative positional relationship, and when an absolute position of a described object changes, the relative positional relationship may also change accordingly.

EMBODIMENTS

Figure 1:
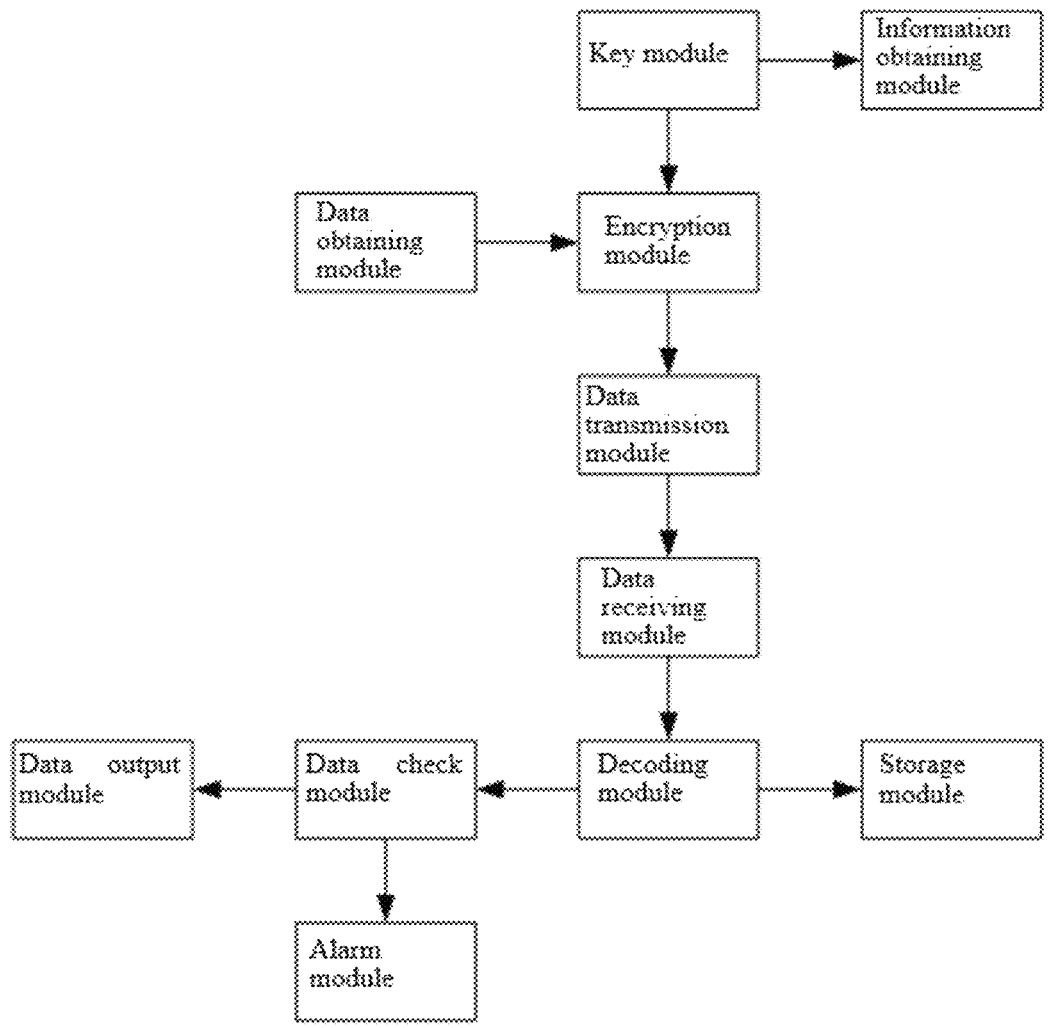
FIG. 1 is a schematic diagram of a structure of an overall system of the present invention.
Figure 2:
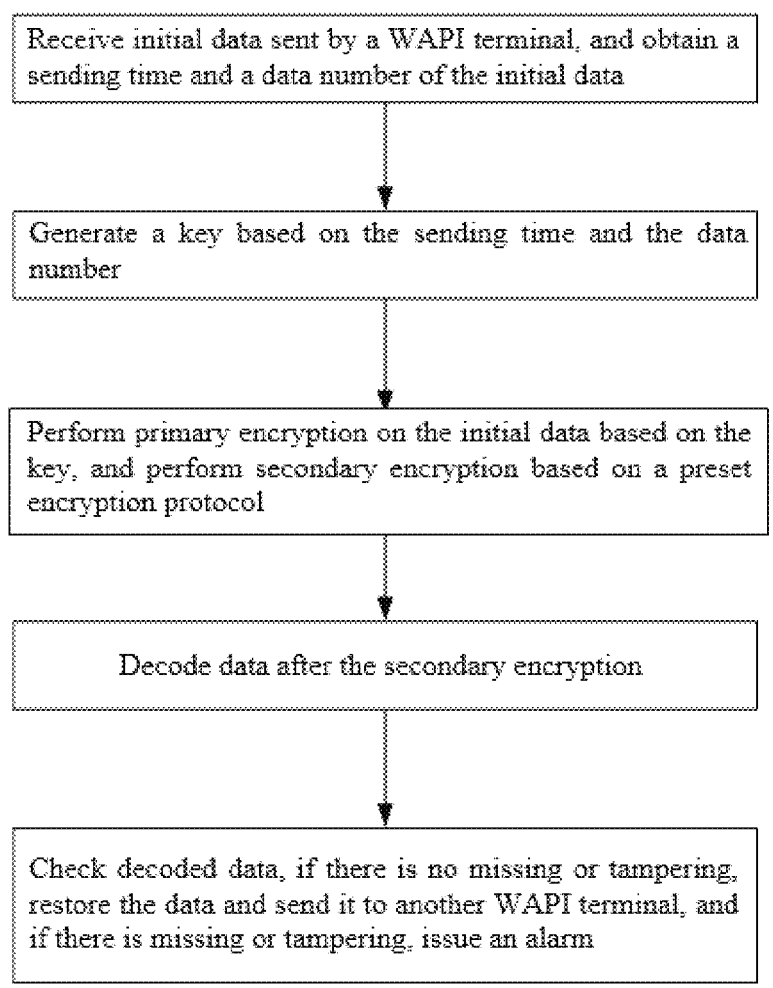
FIG. 2 is a schematic flowchart of the present invention.

Referring to FIG. 1 to FIG. 2, the present invention provides a technical solution as follows:

A WAPI trusted wireless local area network device includes a sending device and a receiving device, where the sending device includes:
a data obtaining module, where the data obtaining module is electrically connected to an encryption module, and is configured to obtain initial data sent by a WAPI terminal and transmit the initial data to the encryption module for encryption;
an information obtaining module, where the information obtaining module is electrically connected to a key module, and is configured to obtain a sending time and a data number when the WAPI terminal sends the initial data and transmit the sending time and the data number to the key module for generating a key;
the key module, where the key module is electrically connected to the encryption module, and is configured to generate the key based on the sending time and the data number of the initial data and encrypt the initial data;
the encryption module, where the encryption module is electrically connected to a data transmission module, an encryption protocol is preset in the encryption module, and the encryption module is configured to perform primary encryption on the initial data based on the key generated by the key module and perform secondary encryption based on the preset encryption protocol; and
the data transmission module, where the data transmission module is in communication connection with a data receiving module, and is configured to transmit data after secondary encryption; and the receiving device includes:
the data receiving module, where the data receiving module is electrically connected to a decoding module, and is configured to send the data after secondary encryption to the decoding module for decoding;
the decoding module, where the decoding module is electrically connected to a data check module and a storage module, a same encryption protocol as that in the encryption module is preset in the decoding module, and the decoding module is configured to decode the data after secondary encryption and send decoded data to the data check module and the storage module respectively;
the storage module, where the storage module is a storage medium such as a floppy disk, a hard disk, an SD card and the like, and is configured to save the decoded data;
the data check module, where the data check module is electrically connected to a data output module and an alarm module, and is configured to check whether data is missing or tampered in a transmission process and issue an alarm signal to the alarm module;
the alarm module, where the alarm module is configured to issue an alarm based on the alarm signal issued by the data check module; and
the data output module, where the data output module is configured to output data.

A logic for generating the key is as follows:
S1: obtaining the sending time of the initial data sent by the WAPI terminal according to a format of year, month, day, hour, minute, and second, marked as Th, dividing the sending time Th into six character segments, marked as $a_i$, i=1,2,3 . . . 6, and Th=$a_1$, $a_2$, $a_3$ . . . $a_6$, where each character segment at is a two-digit number, which is used for representing the year, month, day, hour, minute and second sequentially, and numbering the initial data sent by the WAPI terminal, marked as H, where H is a positive integer, and the value of H is increased by one every time new data is received, for example: in a transmission process, if first initial data that is sent by the WAPI terminal and is obtained by the data obtaining module is a character string "HELLO", and the sending time is 12:53:16 on Oct. 11, 2023, then @1=23, $a_2$=10, $a_3$=11, $a_4$=12, $a_5$=53, $a_6$=16, Th=23,10,11,12,53,16, and H=1; and S2: generating a superposition start bit Pd based on the sending time Th, generating a check bit Py and a check length Pc based on the data number H, sequentially performing data splicing on the superposition start bit Pd, the check bit Py, the check length Pc, the sending time Th, and the data number H, and obtaining a final key, where the key is marked as $M_H$, that is:

$$\text{``}Pd\text{''} + \text{``}Py\text{''} + \text{``}Pc\text{''} + \text{``}Th\text{''} + \text{``}H\text{''} \xrightarrow{data\ splicing} M_H$$

where a subscript H represents a data number corresponding to the key.

A logic for obtaining the superposition start bit Pd is as follows: calculating an average value of a sum of $a_1$~$a_6$ in the sending time Th, marked as Pd', that is:

$$Pd' = \frac{\sum_{i=1}^{6} a_i}{6}$$

and obtaining the superposition start bit Pd after rounding the average value Pd' according to a rounding-off method.

A logic for obtaining the check bit Py is as follows: generating a calculated value Py based on the data number H, with a calculation formula being:

Py'=log H+1 obtaining the check bit Py after rounding the calculated value Py according to a rounding-off method, and calculating a theoretical length Pc' based on the check bit Py, with a calculation formula being:

$Pc'=e^{Py}$ and after rounding the theoretical length Pc' according to the rounding-off method, taking its single digit as the check length Pc.

In this embodiment, the average value is Pd'=(23+10+11+12+53+16)/6=20.833, the superposition start bit Pd=21 is obtained after rounding the average value Pd', the calculated value is Py'=log 1+1=1, the check bit Py=1 is obtained after rounding the calculated value, the theoretical length is Pc'=e, the single digit of the theoretical length is taken as the check length Pc, the check length is Pc=3, and the key is $M_H$=21,1,3,23,10,11,12,53,16,1.

A logic for the primary encryption is as follows:
S1: obtaining a length of the initial data, marked as N, sequentially converting each character in the initial data according to an ASCII code table, marking a conversion character string as Sz, and marking each character segment as $b_j$, j=1,2,3 . . . N, and Sz=$b_1$, $b_2$, $b_3$ . . . $b_N$;

S2: obtaining a value of a corresponding character segment $b_{Py}, b_{Py+1} \ldots b_{Py+Pc-1}$ based on values of the check bit Py and the check length Pc, and marking the value as a check character segment b';

S3: superposing the conversion character string Sz with the sending time Th from the corresponding character segment based on a value of the superposition start bit Pd, obtaining a superposition character string Sz', and marking each character segment in the superposition character string Sz' as $c_p$, p=1,2,3 . . . Pd . . . Pd+q . . . N', where q represents a length of the conversion character string Sz that is superposed with the sending time Th, and N' represents a length of the superposition character string Sz; and S4: splicing the check character segment b', the key $M_H$, and the superposition character string Sz to obtain a primary encryption character string $Sz_1$.

In this embodiment, a length of the initial data "HELLO" is N=5, the conversion character string generated according to the ASCII code table is Sz=72,69,76,76,79, $b_1$=72, $b_2$=69, . . . , $b_5$=79, the check bit is Py=1, and the check length is Pc=3, therefore, the check character segment is b'=72,69,76, the superposition start bit is Pd=21, which is greater than the length N of the initial data, and counting is continued from left to right. In other words, when the superposition start bit Pd is greater than the length N of the initial data, a bit "Pd−kN" is used as a new superposition start bit. When the check bit Py is greater than the length N of the initial data, it is treated in a similar manner, and k is a positive integer. When the check character segment b' exceeds the length of the conversion character string Sz, filling is continued from a leftmost bit of the conversion character string Sz. Therefore, in this embodiment, the conversion character string Sz and the sending time Th are superposed from a first bit, the superposition character string after being superposed is Sz=95,79,87,88,132,16, q=5, and N'=6, and the primary encryption character string $Sz_1$=72,69,76,21,1,3,23,10,11,12,53,16,1,95,79,87,88,132,16 is finally obtained.

A logic for data decoding is as follows:

S1: decoding, by the decoding module, the data after secondary encryption based on the preset encryption protocol, to obtain the primary encryption character string $Sz_1$;

S2: performing data splitting on the primary encryption character string $Sz_1$, to obtain the check character segment b', the key $M_H$, and the superposition character string Sz;

S3: performing data splitting on the key $M_H$, to obtain the superposition start bit Pd, the check bit Py, the check length Pc, the sending time Th, and the data number H; and S4: removing the sending time Th in the superposition character string Sz' from the corresponding character segment based on the value of the superposition start bit Pd, to obtain the conversion character string Sz.

A specific implementation method is to perform reverse operation according to the method of the above embodiment.

A logic for checking data is as follows:

S1: sending, by the decoding module, the check character segment b', the check bit Py, the check length Pc, and the conversion character string Sz that are obtained from splitting to the data check module;

S2: obtaining a value of the corresponding character segment $b_{Py}, b_{Py+1} \ldots b_{Py+Pc-1}$ in the conversion character string Sz based on the values of the check bit Py and the check length Pc, and comparing the value with the check character segment b'; and S3: if the value is equal to the check character segment b', restoring the conversion character string Sz according to ASCII codes and transmitting the conversion character string to the data output module, and if the value is not equal to the check character segment b', issuing the alarm signal to the alarm module.

In this embodiment, the check bit Py=1, the check length Pc=3, the check character segment b=72,69,76, and the conversion character string Sz=72,69,76,76,79 are received by the data check module, when the corresponding character segment $b_1$=72, $b_2$=69, $b_3$=76 is equal to the check character segment b', it is considered that the data is not missing or tampered in the transmission process, and the conversion character string Sz is restored according to the ASCII codes and transmitted to the data output module, otherwise, the alarm signal is issued to the alarm module.

To sum up, a specific process of this embodiment is as follows:

receiving initial data sent by a WAPI terminal, and obtaining a sending time and a data number of the initial data;

generating a key based on the sending time and the data number;

performing primary encryption on the initial data based on the key, and performing secondary encryption based on a preset encryption protocol;

decoding data after the secondary encryption; and checking decoded data, if there is no missing or tampering, restoring the data and send it to another WAPI terminal, and if there is missing or tampering, issuing an alarm.

All or some of the foregoing embodiments may be implemented by means of software, hardware, firmware, or any combination thereof. When software is used to implement the embodiments, the foregoing embodiments may be implemented completely or partially in a form of a computer program product. A person of ordinary skill in the art may be aware that in combination with examples described in embodiments disclosed in this specification, units and algorithm steps can be implemented by electronic hardware or a combination of computer software and electronic hardware. Whether the functions are performed by hardware or software depends on particular applications and design constraints of the technical solutions.

The units described as separate parts may or may not be physically separate, and parts displayed as units may or may not be physical units, that is, may be located in one position, or may be distributed on a plurality of network units. Some or all of the units may be selected depending on actual requirements to achieve the objectives of the solutions in the embodiments.

The above is only the specific implementation method of the present application, but the scope of protection of the present application is not limited to this. Any changes or replacements that can be easily thought by those skill in the art within the scope of disclosure of the present application should fall within the scope of protection of the present application.

What is claimed is:

1. A WAPI (WLAN (Wireless Local Area Network) Authentication and Privacy Infrastructure) trusted wireless local area network device, comprising a sending device and a receiving device, wherein the sending device comprises: a data obtaining module, wherein the data obtaining module is electrically connected to an encryption module, and is configured to obtain initial data sent by a WAPI terminal and transmit the initial data to the encryption module for encryption; an information obtaining module, wherein the information obtaining module is electrically connected to a key module, and is configured to obtain a sending time and a data number when the WAPI terminal sends the initial data and transmit the sending time and the data number to the key module for generating a key; the key module, wherein the key module is electrically connected to the encryption module, and is configured to generate the key based on the sending time and the data number of the initial data and encrypt the initial data; the encryption module, wherein the encryption module is electrically connected to a data transmission module, an encryption protocol is preset in the encryption module, and the encryption module is configured to perform primary encryption on the initial data based on the key generated by the key module and perform secondary encryption based on the preset encryption protocol; and the data transmission module, wherein the data transmission module is in communication connection with a data receiving module, and is configured to transmit data after secondary encryption; and the receiving device comprises: the data receiving module, wherein the data receiving module is electrically connected to a decoding module, and is configured to send the data after secondary encryption to the decoding module for decoding; the decoding module, wherein the decoding module is electrically connected to a data check module and a storage module, a same encryption protocol as that in the encryption module is preset in the decoding module, and the decoding module is configured to decode the data after secondary encryption and send decoded data to the data check module and the storage module respectively; the storage module, wherein the storage module is configured to save the decoded data; the data check module, wherein the data check module is electrically connected to a data output module and an alarm module, and is configured to check whether data is missing or tampered in a transmission process and issue an alarm signal to the alarm module; the alarm module, wherein the alarm module is configured to issue an alarm based on the alarm signal issued by the data check module; and the data output module, wherein the data output module is configured to output data; wherein a logic for generating the key is as follows: obtaining the sending time of the initial data sent by the WAPI terminal according to a format of year, month, day, hour, minute, and second, marked as Th, dividing the sending time Th into six character segments, marked as, i=1,2,3 ... 6, and Th=$a_1$, $a_2$ $a_3$ ... $a_6$ wherein each character segment a is a two-digit number, which is used for representing the year, month, day, hour, minute and second sequentially, and numbering the initial data sent by the WAPI terminal, marked as H; and generating a superposition start bit Pd based on the sending time Th, generating a check bit Py and a check length Pc based on the data number H, sequentially performing data splicing on the superposition start bit Pd, the check bit Py, the check length Pc, the sending time Th, and the data number H, and obtaining a final key, wherein the key is marked as $M_H$, that is: "Pd"+ "Py"+ "Pc"+"Th"+"H" data splicing $M_H$ wherein a subscript H represents a data number corresponding to the key; wherein a logic for the primary encryption is as follows: obtaining a length of the initial data, marked as N, sequentially converting each character in the initial data according to an ASCII code table, marking a conversion character string as Sz, and marking each character segment as $b_1$,j=1,2,3–N, and Sz=$b_1$,$b_2$,$b_3$ ... $b_n$; obtaining a value of a corresponding character segment $b_{Py, b_{Py+1}}$ ... $b_{Py+pc-1}$, based on values of the check bit Py and the check length Pc, and marking the value as a check character segment b'; superposing the conversion character string Sz with the sending time Th from the corresponding character segment based on a value of the superposition start bit Pd, obtaining a superposition character string Sz', and marking each character segment in the superposition character string Sz' as $c_p$, p=1,2,3–Pd–Pd+q–N', wherein q represents a length of the conversion character string Sz that is superposed with the 2 sending time Th, and N' represents a length of the superposition character string Sz'; and splicing the check character segment b', the key $M_H$, and the superposition character string Sz' to obtain a primary encryption character string $Sz_{1.1}$.

2. The WAPI trusted wireless local area network device according to claim 1, wherein a logic for obtaining the superposition start bit Pd is as follows: calculating an average value of a sum of $a_1$~$a_6$ in the sending time Th, marked as Pd', that is:

$$Pd' = \frac{\sum_{i=1}^{6} a_i}{6}$$

and obtaining the superposition start bit Pd after rounding the average value Pd' according to a rounding-off method.

3. The WAPI trusted wireless local area network device according to claim 1, wherein a logic for obtaining the check bit Py is as follows: generating a calculated value Py' based on the data number H, with a calculation formula being:

$$Py'=\log H+1$$

obtaining the check bit Py after rounding the calculated value Py' according to a rounding-off method, and calculating a theoretical length Pc' based on the check bit Py, with a calculation formula being:

$$Pc'=e^{Py}$$

and after rounding the theoretical length Pc' according to the rounding-off method, taking its single digit as the check length Pc.

4. The WAPI trusted wireless local area network device according to claim 1, wherein a logic for data decoding is as follows:

decoding, by the decoding module, the data after secondary encryption based on the preset encryption protocol, to obtain the primary encryption character string $Sz_1$;

performing data splitting on the primary encryption character string $Sz_1$, to obtain the check character segment b', the key $M_H$, and the superposition character string Sz';

performing data splitting on the key $M_H$, to obtain the superposition start bit Pd, the check bit Py, the check length Pc, the sending time Th, and the data number H; and removing the sending time Th in the superposition character string Sz' from the corresponding character segment based on the value of the superposition start bit Pd, to obtain the conversion character string Sz.

5. The WAPI trusted wireless local area network device according to claim 1, wherein a logic for checking data is as follows:

sending, by the decoding module, the check character segment b', the check bit Py, the check length Pc, and the conversion character string Sz that are obtained from splitting to the data check module;

obtaining a value of the corresponding character segment $b_{Py}, b_{Py+1} \ldots b_{Py+Pc-1}$ in the conversion character string Sz based on the values of the check bit Py and the check length Pc, and comparing the value with the check character segment b'; and if the value is equal to the check character segment b', restoring the conversion character string Sz according to ASCII codes and transmitting the conversion character string to the data output module, and if the value is not equal to the check character segment b', issuing the alarm signal to the alarm module.

\* \* \* \* \*